United States Patent [19]

Yamanaka

[11] 4,220,977
[45] Sep. 2, 1980

[54] SIGNAL TRANSMISSION CIRCUIT

[75] Inventor: Seisuke Yamanaka, Mitaka, Japan

[73] Assignee: Sony Corporation, Tokyo, Japan

[21] Appl. No.: 954,099

[22] Filed: Oct. 24, 1978

[30] Foreign Application Priority Data

Oct. 27, 1977 [JP] Japan .................. 52/128913

[51] Int. Cl.³ ............................................ H04N 3/15
[52] U.S. Cl. ..................................... 358/213; 358/41; 358/160
[58] Field of Search ................. 358/41, 209, 212, 213, 358/160

[56] References Cited

U.S. PATENT DOCUMENTS

| 4,038,690 | 7/1977 | Hoagland | 358/213 |
| 4,071,853 | 1/1978 | Yamanaka | 358/213 |
| 4,153,915 | 5/1979 | McKechnie | 358/213 |

Primary Examiner—Richard Murray
Attorney, Agent, or Firm—Hill, Van Santen, Steadman, Chiara & Simpson

[57] ABSTRACT

The present invention relates generally to a signal transmission circuit in which a plurality of sampling circuits are interposed, and is directed more particularly to such a signal transmission circuit suitable for use in the signal processing circuit of a solid state television camera in which a semiconductor device such as a CCD and a BBD (bucket brigade device) is employed.

12 Claims, 25 Drawing Figures

FIG. 4A  $f(x)$ $P_1(x)$ $O_1(x)$ $S_1(x)$ $P_2(x)$ $O_2(x)$ $S_2(x)$

FIG. 5A
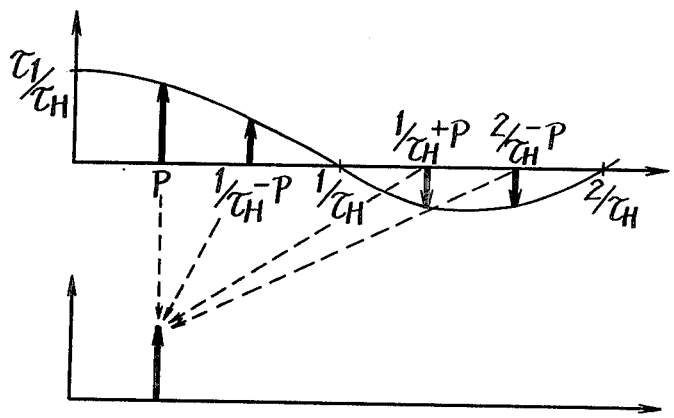
FIG. 5B
FIG. 6
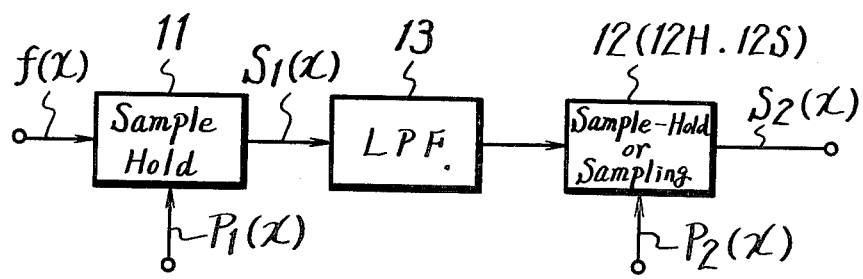
FIG. 11A
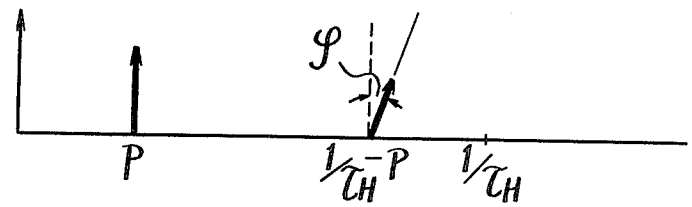
FIG. 11B
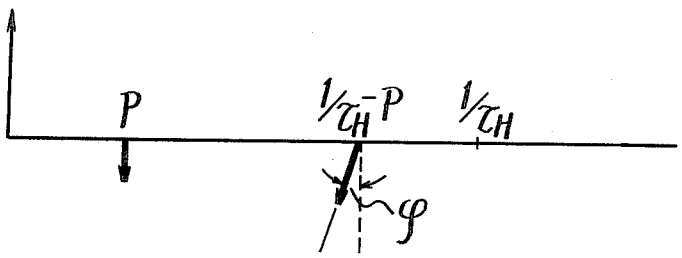

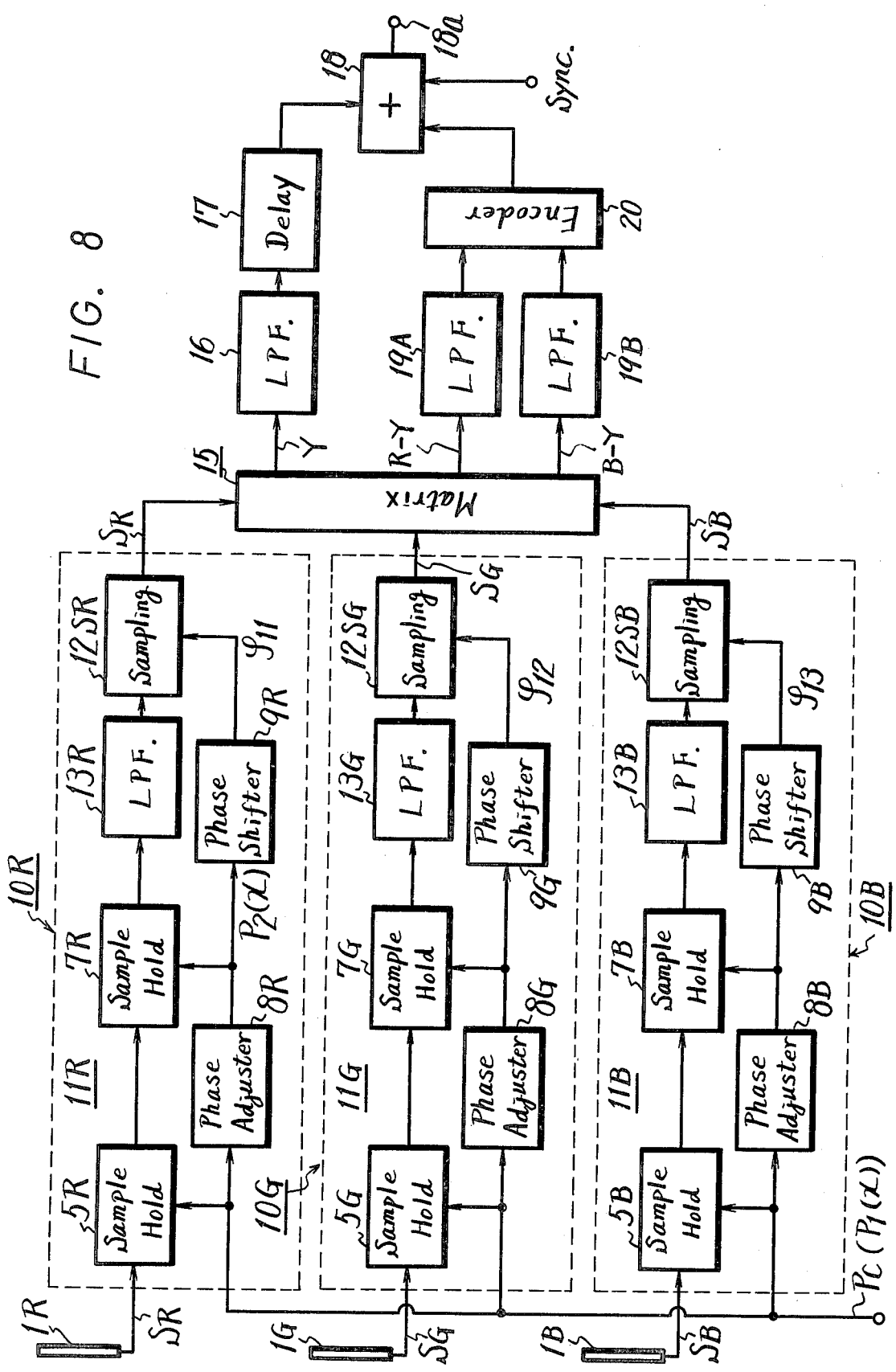

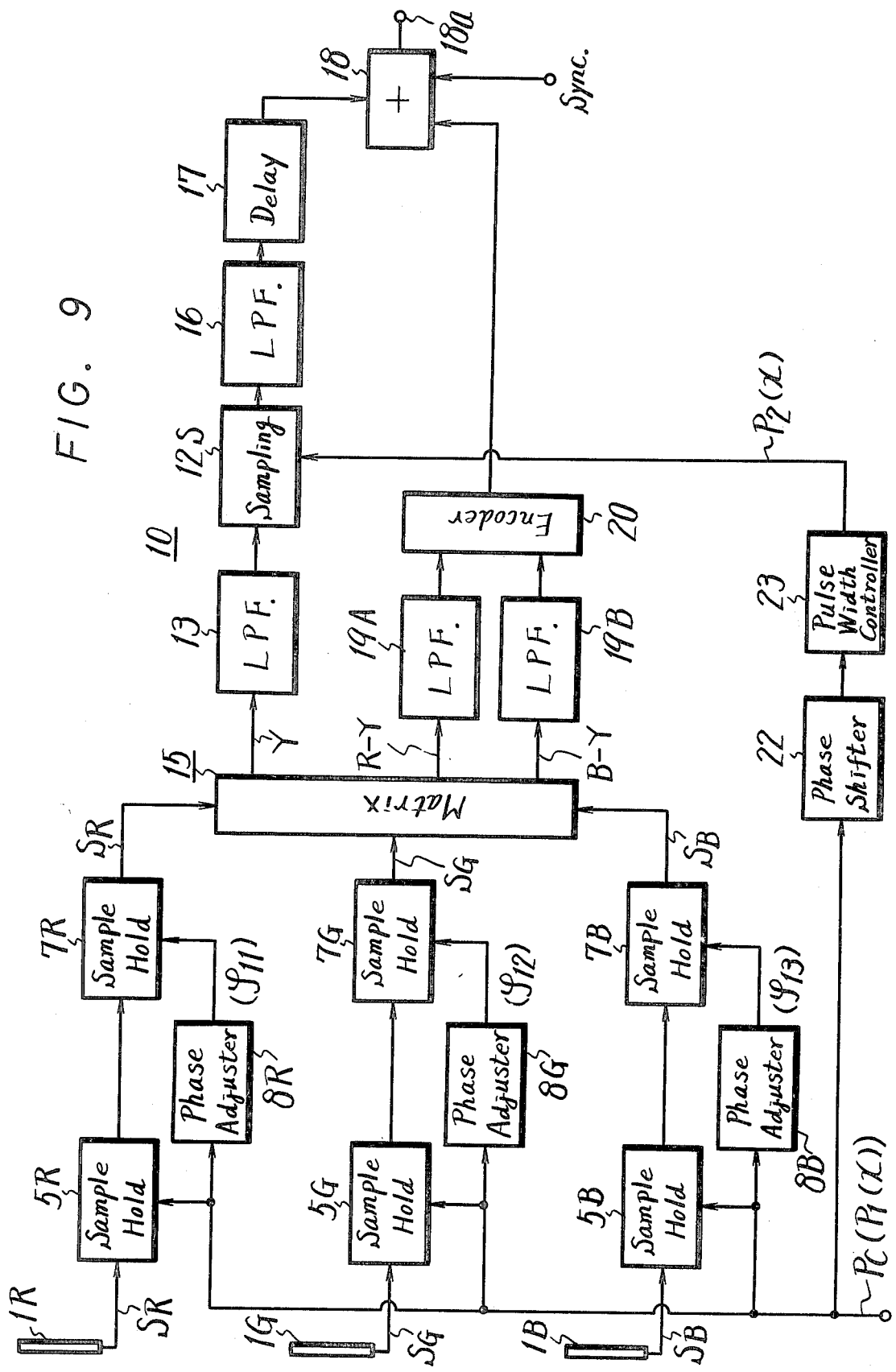

$\alpha = (\theta_{12} - \varphi_{12})\tau_H - \varphi_{12}$ $\beta = (\theta_{13} - \varphi_{13})\tau_H - \varphi_{13}$

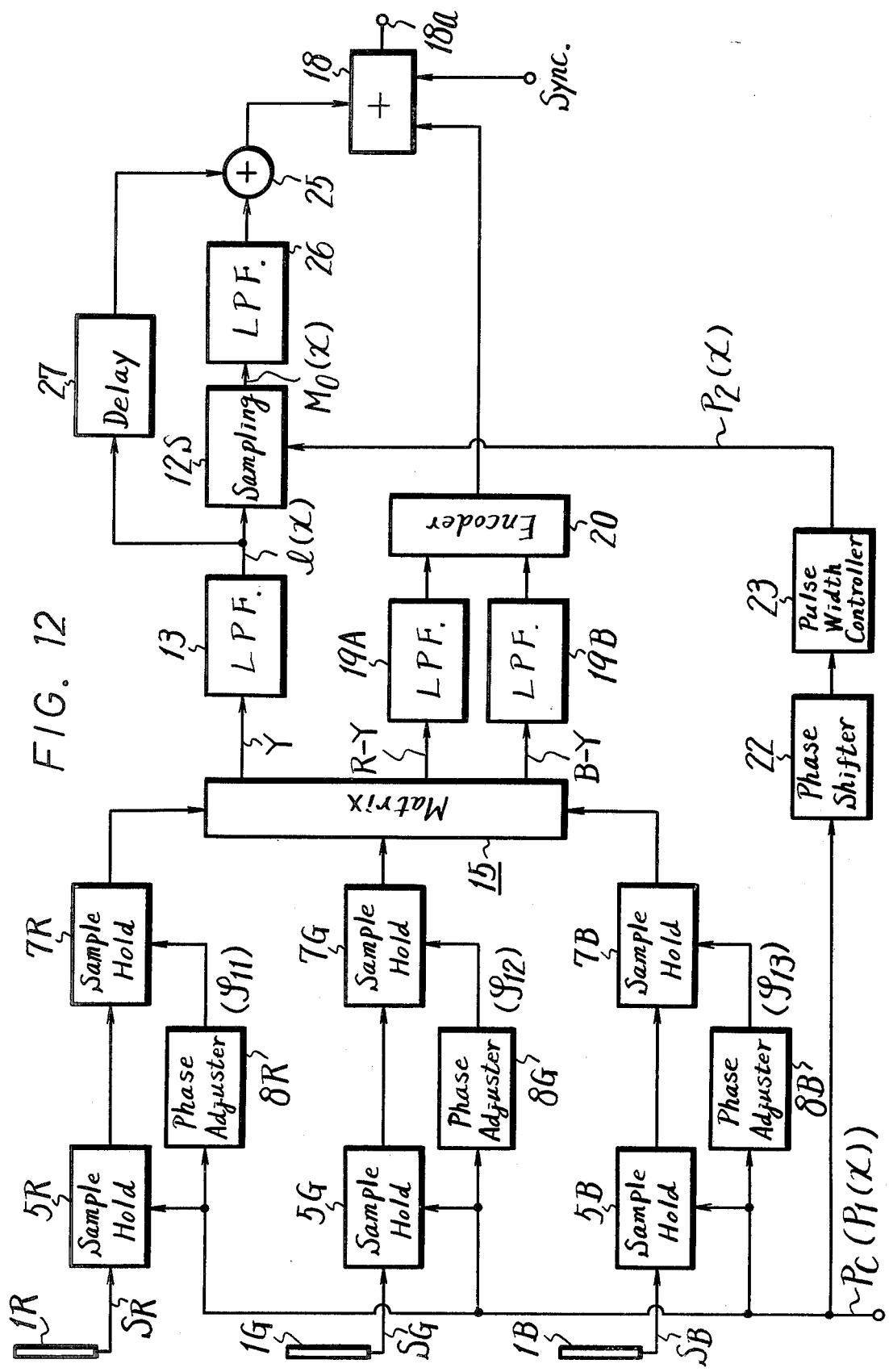

SIGNAL TRANSMISSION CIRCUIT

DESCRIPTION OF THE PRIOR ART

By way of example, a prior art solid state television camera using a CCD imager will be now considered. With such a prior art television camera, the output signal from an imaging device is passed through a circuit consisting of a sampling circuit and/or sample-hold circuit connected in cascade to be a final signal. In this case, it is noted that the signal is apt to be deteriorated by the sampling action. This may be considered from the fact that minus components lying above the sampling frequency, which is generated by the first sample-hold action, cancel out effective signal components existing lower than the sampling frequency by the second sampling action, which will be described later.

Fundamentally speaking, the output from a solid state image sensor is a sampled type signal and low in signal level, so that even a little signal deterioration can not be neglected. In a charge transfer device such as a CCD, there are many cases where the sample-hold function is required in deriving a signal from the device itself. Accordingly, the sampling action, which is carried out once after the signal is derived, deteriorates the frequency response of the solid state imaging system in the prior art system.

OBJECTS AND SUMMARY OF THE INVENTION

An object of the present invention is to provide a signal transmission circuit having a sampling and/or sample-hold circuit.

Another object of the invention is to provide a novel signal transmission circuit in which circuits with the sampling function are connected in series.

According to the fundamental construction of the invention, a sample-hold circuit, a low pass filter and a sampling circuit (or may be a sample-hold circuit) are connected in series. A sampling pulse train applied to the respective circuits are the same in frequency but may be different in phase and window width.

In the usual manner, the sample-hold circuit shows low pass filter characteristics to a signal to be transmitted therethrough. In this invention, such low pass filter characteristics of the sample-hold circuit are able to be cancelled or compensated for by interposing a low pass filter having a cut-off frequency of about the sampling frequency. In this case, the last connected sampling circuit determines the phase of an output signal. Accordingly, by adjusting the window phase and window width of the sampling pulse applied to the last connected sampling circuit, the phase of the output signal from the CCD imaging device is determined.

Therefore, the signal transmission circuit of the invention can be applied to an image pick-up system which uses a plurality of image sensor chips to improve its resolution. In such a system it is required that the phase of an output signal is arranged in response to a chip displacement. When the present invention is applied to such a phase arrangement of the output signal, the phase arrangement of the output signal can be performed while signal compensation is achieved.

The additional, and other objects, features and advantages of the present invention will become clear from the following description taken in conjunction with the accompanying drawings through which the like reference numerals and letters indicate the same elements.

BRIEF DESCRIPTION OF THE DRAWINGS

FIGS. 4A to 4G are diagrams used for explaining a sampling operation;

FIGS. 5A and 5B are diagrams used for the explanation of the operation of a prior circuit;

FIG. 6 is a block diagram showing the fundamental construction of the present invention;

FIGS. 8 and 9 are respectively block diagrams showing solid state television cameras to which the invention is applied;

FIGS. 10A to 10D and 11A to 11B are respectively explanatory diagrams on alignment errors; and FIG. 12 is a block diagram showing another example of the invention.

DESCRIPTION OF THE PREFERRED EMBODIMENTS

In a solid state television camera, there is a case where a sample-hold circuit and a circuit having the sampling function (sampling circuit, sample-hold circuit or the like) are connected in cascade in the signal transmission line or path for generating a desired video signal from an output of a solid state imaging element.

For example, such a solid state television camera can be exemplified as an example with the above circuit in which three imaging devices pick up (sample) an object to cancel side band components existing in picked-up outputs so as to suppress bad affects on a reproduced picture to expand a frequency band. Such an example is disclosed in the U.S. Pat. No. 3,975,760.

Figure 1:
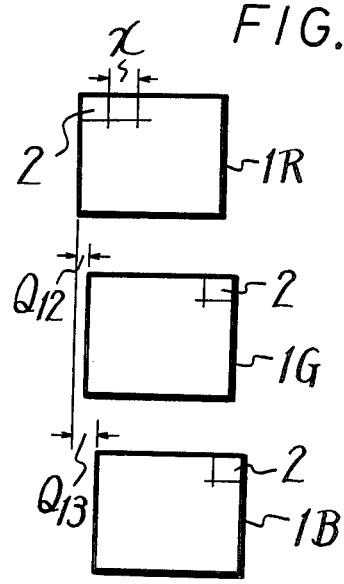
FIG. 1 is a schematic diagram showing the arrangement relation of imaging elements.

The feature of this example is that when the same object is picked up, the sampling points by picture elements of three image sensing devices are shifted or displaced. For example, as shown in FIG. 1, in view of the spatial positional relation of three image sensing devices 1R, 1G and 1B, they are sequentially displaced in the horizontal direction with respect to the object by, for example $\frac{1}{3}X$ for the arranging pitch x of picture cells or elements 2, which are arranged in the horizontal direction, corresponding to a scanning time $\tau_H$, while in view of the phase relation when the image sensing device 1R is taken as a reference, the image sensing device 1G such as a CCD chip is given with a phase difference of $\theta_{12}$ from the CCD chip 1R and the CCD chip 1B is given with a phase difference of $\theta_{13}$ from the CCD chip 1R, respectively.

The above example is a color television camera, so that output signals corresponding to the primary colors R (red), G (green) and B (blue are derived from the CCD chips 1R, 1G and 1B, respectively.

Figure 2:
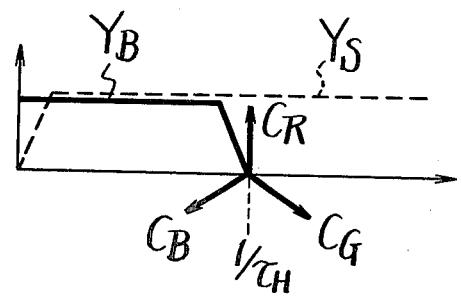
FIG. 2 is a graph showing the frequency characteristics of a picked-up output.

In the case where the spatial relation between the objective image and the CCD chips 1R to 1B is selected as above, if the sampling timing of the respective CCD chips 1R to 1G is selected, or the signals are read out therefrom, satisfying the above relation in view of time, the output level and the positional relation of the sampling pulses become as shown in FIG. 2.

FIG. 2 shows the composite signal, in which $Y_B$ represents a base band component, $Y_S$ represents a side band component, and the phase relation among carriers (sampling pulses) $C_R$, $C_G$ and $C_B$ of the side band component $Y_S$ becomes as shown in FIG. 2. When the spatial relation completely satisfies the above condition, $\theta_{12} = 120°$ and $\theta_{13} = 240°$, respectively. Therefore, when the object is a black and white image, in the composite output the side band component $Y_S$ is cancelled and hence the composite output becomes only the base band component $Y_B$.

Figure 3:
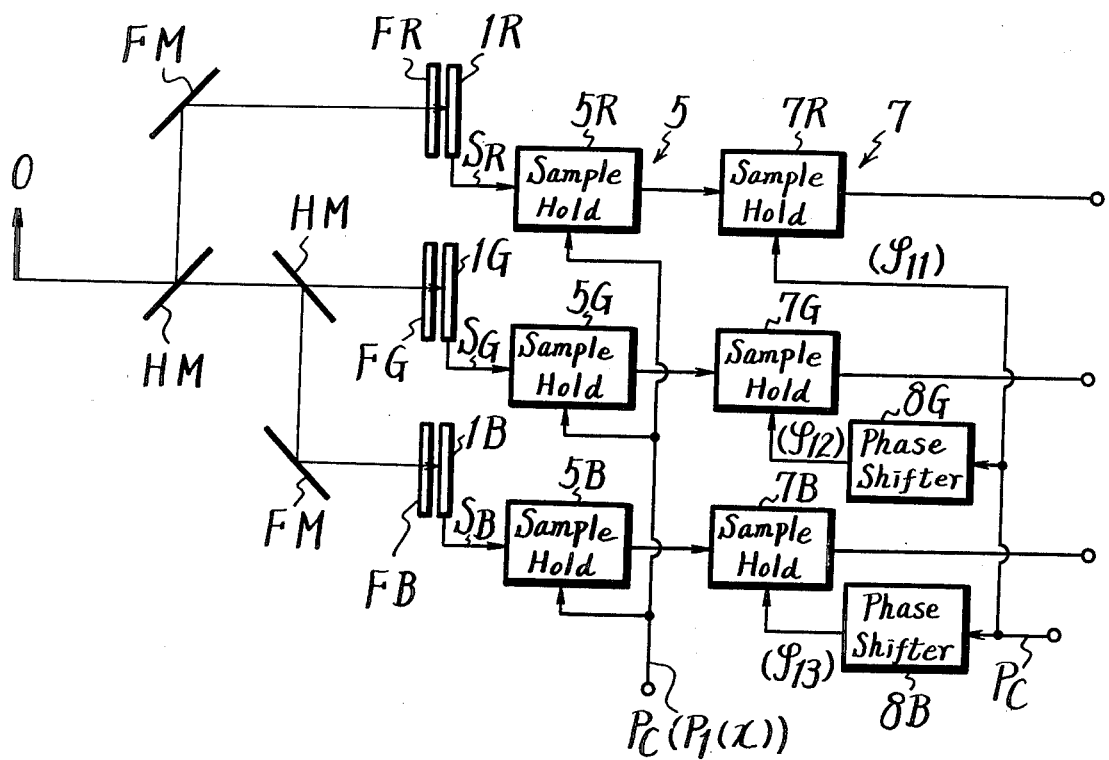
FIG. 3 is a systematic block diagram showing an image sensing apparatus.
Figure 4B:
Figure 4C:
Figure 4D:
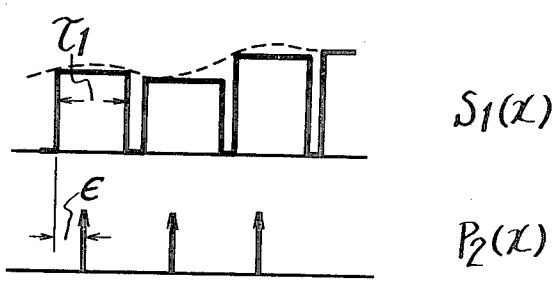
Figure 4E:
Figure 4F:
Figure 4G:
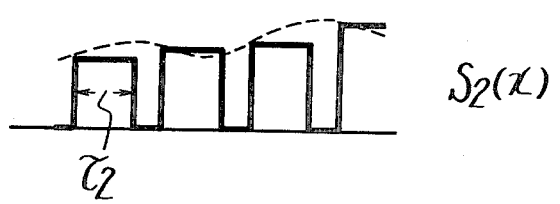

FIG. 3 shows an example of the circuit system which will achieve the above purpose. In this example, the light from an object O is focussed through half mirrors HM and full mirrors FM on the respective imaging devices 1R, 1G and 1B. In this case, color filters FR, FG and FB are located in front of the imaging devices 1R, 1G and 1B, respectively.

The horizontal shift registers (not shown) provided in the respective imaging devices 1R to 1B are supplied with a clock pulse $P_C$ (with the frequency of, for example $1/\tau_H$) for sampling (reading out), respectively. Generally speaking, the clock pulses applied to the respective horizontal shift registers has to be selected equal in phase to the spatial phase. But in the FIG. 3 embodiment, the clock pulses $P_C$ with the same phase are applied to the respective horizontal shift registers and in turn, the matching to the spatial phase is established after the first sampling.

Namely, a picked-up output $S_R$ from the imaging device 1R is fed through a first sample-hold circuit 5R for wave-shaping to a second sample-hold circuit 7R for phase-matching. In this case, the clock pulse $P_C$ is used as the sampling signal.

Similarly, the other picked-up outputs $S_G$ and $S_B$ from the other imaging devices 1G and 1B are wave-shaped by sample-hold circuits 5G and 5B and thereafter adjusted in phase by sample-hold circuits 7G and 7B, respectively. That is, phases $\phi_{12}$ and $\phi_{13}$ of the sampling signals applied to the sample-hold circuits 7G and 7B are adjusted to be coincident with the spatial phases $\theta_{12}$ and $\theta_{13}$. In FIG. 3, 8G and 8B designate phase-adjusting circuits for the above purpose, respectively. The respective picked-up outputs $S_R$, $S_G$ and $S_B$ thus phase-adjusted are applied, as well known, to an encoder (which includes a matrix circuit) which then produces a desired color video signal.

It is ascertained that when the pair of sample-hold circuits 5 and 7 are interposed in the transmission systems of the picked-up outputs $S_R$ to $S_B$, the frequency characteristics thereof are deteriorated by the sample-hold circuits 5 and 7.

The reason why the frequency characteristics are deteriorated is explained as follows. First, the characteristics of the sample-hold circuits will be now considered. The characteristics can be deemed such that, as shown in FIGS. 4A to 4G, an input signal $f(x)$ (refer to FIG. 4A) is sampled by an ideal sampling pulse $P_1(x)$ (refer to FIG. 4B) with the pulse width of zero and thereafter a sampled output $O_1(x)$ (refer to FIG. 4C) is held for a constant time period $\tau_1$ (refer to FIG. 4D). This holding effect can be considered as a kind of low pass effects.

The frequency characteristics can be expressed $\tau_1 (\sin \pi \tau_1 p / \pi \tau_1 p) e^{-j2\pi p \tau_1/2}$ when the input signal $f(x)$ is expressed as $f(x) = \cos 2\pi p x$ (where p represents the repeating frequency). But, when the sample-hold circuits are connected in cascade, there is not obtained such an output that the above operation is repeated twice. Although the theoretical detailed explanation is omitted, the conclusion is as follows. In the output signal, the holding effect of the signal is determined not by the former sample-hold circuit but by the latter sample-hold circuit, and the output signal is delivered under such a state that the output signal is delayed for the input signal $f(x)$ by a phase difference $\epsilon$ (refer to FIG. 4E) between the sampling pulses $P_1(x)$ and $P_2(x)$ of both the sample-hold circuits. Accordingly, even if the sample-hold circuits are connected in cascade over several stages, the hold effect of an output signal $S_2(x)$ (refer to FIG. 4G) is determined by the sample-hold circuit at the final stage.

If the input signal is taken as $f(x)$ and the ideal sampling pulse train is taken as $p(x)$, respectively, the following equation (1) is established, $$P(x) = \Sigma \delta(x - n\tau_H) \tag{1}$$

Thus, the output signal $S_2(x)$ is expressed as follows:

$$S_2(x) = [f(x - \epsilon) \times p_1(x - \epsilon)]^* \operatorname{rect}\left(\frac{x - \frac{\tau_2}{2}}{\tau_2}\right) \tag{2}$$

$$\text{where } \operatorname{rect}(x) = 1 \quad |x| \leq \tfrac{1}{2} \tag{3}$$
$$\qquad\qquad\quad = 0 \quad |x| > \tfrac{1}{2}$$

and * represents convolution products.

In the equation (2), the left half term of the right side thereof is a signal $O_2(x)$ itself (refer to FIG. 4F), which is subjected to the delay caused by the phase difference $\epsilon$ between the sampling pulses $P_1(x)$ and $P_2(x)$, and the remaining right half term of the same side is one representing the holding effect with the width of $\tau_2$. That is, the final output $S_2(x)$ is obtained by applying the holding effect to the sampled output $O_2(x)$.

Next, the frequency characteristics of the output signal will be now considered. Now, the frequency characteristics of the output signal $O_2(x)$ is considered in two ways.

From the equation (2), the following equation (4) is derived.

$$O_2(x) = f(x - \epsilon) \times \Sigma \delta(x - n\tau_H - \epsilon) \tag{4}$$

The frequency component thereof can be expressed as follows by the Fourier transformation.

$$O_2(f) = \frac{1}{\tau_H} e^{-j2\pi f \epsilon} \sum_n F\left(f - \frac{n}{\tau_H}\right) \tag{5}$$

While the frequency component of the output signal $S_1(x)$ is expressed by the following equation (6), since it is obtained by holding the output signal $O_1(x)$ with the holding width (window width)

$$S_1(f) = \frac{\tau_1}{\tau_H} \cdot \frac{\sin \pi \tau_1 f}{\pi \tau_1 f} \cdot e^{-j2\pi f \frac{\tau_1}{2}} \cdot \sum_m F\left(f - \frac{m}{\tau_H}\right) \tag{6}$$

Since the output signal $O_2(x)$ is obtained by sampling signal $S_1(x)$ with the ideal sampling pulse train $P_2(x)$, the frequency component $O_2(f)$ of the former can be also expressed as follows:

$$O_2(f) = S_1(f) * \frac{1}{\tau_H} \sum_l \delta(f - \frac{l}{\tau_H}) e^{-j2\pi \frac{l\epsilon}{\tau_H}} \quad (7)$$

$$= \frac{\tau_1}{\tau_H} \cdot \frac{1}{\tau_H} \sum_l \frac{\sin \pi \tau_1 (f - \frac{l}{\tau_H})}{\pi \tau_1 (f - \frac{l}{\tau_H})} e^{-j2\pi (f - \frac{l}{\tau_H}) \frac{\tau_1}{2}}$$

$$e^{-j2\pi \frac{l\epsilon}{\tau_H}} \times \sum_m F(f - \frac{m+l}{\tau_H})$$

Since the equations (5) and (7) must be the same, therefore, $M+l=n$. Thus, from the equations (5) and (7) the following equation (8) is obtained.

$$\frac{\tau_1}{\tau_H} \cdot \sum_l \frac{\sin \pi \tau_1 (f - \frac{l}{\tau_H})}{\pi \tau_1 (f - \frac{l}{\tau_H})} \cdot \quad (8)$$

$$e^{-j2\pi (f - \frac{l}{\tau_H}) \frac{\tau_1}{2}} e^{-j2\pi f \frac{l\epsilon}{\tau_H}} = e^{-j2\pi f\epsilon}$$

In order to make the effect clear, if $$\epsilon = \frac{\tau_1}{2}$$

the equation (8) can be rewritten as follows:

$$\frac{\tau_1}{\tau_H} \sum \frac{\sin \pi \tau_1 (f - \frac{l}{\tau_H})}{\pi \tau_1 (f - \frac{l}{\tau_H})} = 1 \quad (9)$$

Now, if the input signal $f(x)$ can be expressed by the following equation (1), $$f(x) = \cos 2\pi p x \quad (10)$$

the equation can be rewritten as follows:

$$\frac{\tau_1}{2\tau_H} \sum_k \frac{\sin \pi \tau_1 (\frac{k}{\tau_H} \pm p)}{\pi \tau_1 (\frac{k}{\tau_H} \pm p)} = 1 \quad (11)$$

Since the equation (11) is established irrespective of the repeating frequency P of the object, an output with a constant amplitude can be, of course, delivered.

By the way, the left side of the equation (11) can be expressed as follows:

$$L = \frac{\tau_1}{\tau_H} \left\{ \frac{\sin \pi \tau_1 p}{\pi \tau_1 p} + \frac{\sin \pi \tau_1 (\frac{1}{\tau_H} - p)}{\pi \tau_1 (\frac{1}{\tau_H} - p)} + \frac{\sin \pi \tau_1 (\frac{1}{\tau_H} + p)}{\pi \tau_1 (\frac{1}{\tau_H} + p)} \right\} \quad (12)$$

If it is assumed that $\tau_1 \simeq \tau_H$ in the equation (12), $$2N - 1 \leq \tau_1 (\frac{n}{\tau_H} \pm p) \leq 2N \quad (13)$$

When $N=1, 2, \ldots$ in the equation (13), $$\frac{\sin \pi \tau_1 (\frac{n}{\tau_H} \pm p)}{\pi \tau_1 (\frac{n}{\tau_H} \pm p)} \leq 0 \quad (14)$$

Since the following conditions (15) and (16) are established, $$\left| \frac{\sin \pi \tau_1 (\frac{n}{\tau_H} + p)}{\pi \tau_1 (\frac{n}{\tau_H} + p)} \right| > \left| \frac{\sin \pi \tau_1 (\frac{n+1}{\tau_H} + p)}{\pi \tau_1 (\frac{n+1}{\tau_H} + p)} \right| \quad (15)$$

$$\left| \frac{\sin \pi \tau_1 (\frac{n}{\tau_H} - p)}{\pi \tau_1 (\frac{n}{\tau_H} - p)} \right| > \left| \frac{\sin \pi \tau_1 (\frac{n+1}{\tau_H} - p)}{\pi \tau_1 (\frac{n+1}{\tau_H} - p)} \right| \quad (16)$$

the left term L of the equation (11) can be expressed as follows:

$$L = \frac{\tau_1}{\tau_H} \left\{ \frac{\sin \pi \tau_1 p}{\pi \tau_1 p} + \frac{\sin \pi \tau_1 (\frac{1}{\tau_H} - p)}{\pi \tau_1 (\frac{1}{\tau_H} - p)} + \ldots \right\} \quad (17)$$

$$= \frac{\tau_1}{\tau_H} \left\{ \frac{\sin \pi \tau_1 p}{\pi \tau_1 p} + \frac{\sin \pi \tau_1 (\frac{1}{\tau_H} - p)}{\pi \tau_1 (\frac{1}{\tau_H} - p)} \right\}$$

$$+ \frac{\tau_1}{\tau_H} \left\{ \frac{\sin \pi \tau_1 (\frac{1}{\tau_H} + p)}{\pi \tau_1 (\frac{1}{\tau_H} + p)} + \frac{\sin \pi \tau_1 (\frac{2}{\tau_H} - p)}{\pi \tau_1 (\frac{2}{\tau_H} - p)} + \ldots \right\}$$

The second term of the right side of the equation (17) is a negative component.

Due to the fact that there exists the negative component expressed by the above equation, the output level L is forced to be reduced and consequently, the frequency characteristics are deteriorated.

Now, the deterioration of frequency characteristics will be described briefly. Since the sample-hold circuit is a kind of modulating circuit, the sampling pulse $P_2(x)$ for the sample-hold circuit at the rear stage is modulated by the respective frequency components (p, $1/\tau_H - p$, $1/\tau_H + p$, ...) of the first held output $S_1(x)$ (refer to FIGS. 5A and 5B). The modulating signal contains positive and negative components, so that the composite modulated components thereby are affected by the negative modulating signal, then the output level thereof is made constant and the frequency characteristics are determined. Though the frequency characteristics are determined by the next holding effect, the characteristics are such that the high frequency band component is deteriorated, for which improvement is desired.

When the sample-hold circuit at the rear stage is a mere sampling circuit, the holding effect is determined by the first sample-hold circuit and a phenomenon similar to that set forth above is accompanied.

The present invention, in consideration of the foregoing, is to improve the frequency characteristics and in theory to remove the component expressed by the second term of the right side of the equation (17). That is, with the present invention, as shown in FIG. 6 which shows the fundamental construction thereof, a filter 13 having the low pass characteristic is interposed between a sample-hold circuit 11 and a circuit 12 having the sampling function which are connected in cascade. The cut-off frequency of the filter 13 is selected to be $1/\tau_H$ in theoretical point of view, but possible somewhat higher or lower than $1/\tau_H$ in accordance with a purpose of the circuit with no problem. By this, the negative component of the right side of the equation (17) can be removed completely, so that the output level in the case where the filter 13 is interposed is increased as compared with the case where the filter 13 is not used. Thus, the frequency characteristics, especially those lower than the intermediate frequency band can be improved much.

Figure 7A:
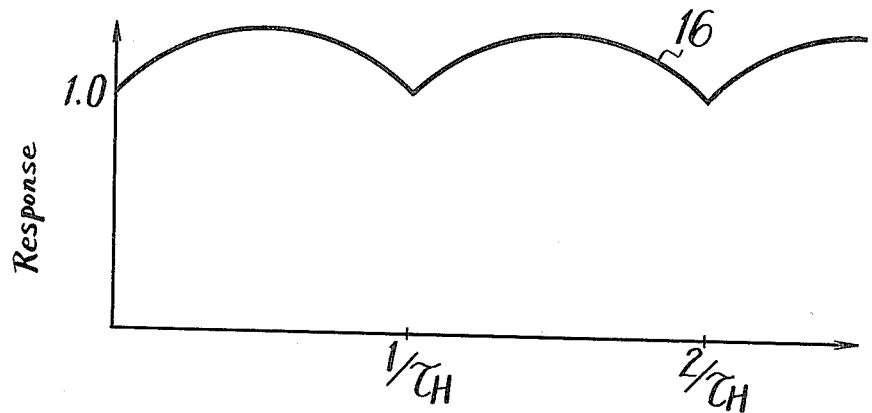
FIGS. 7A, 7B and 7C are diagrams showing the frequency characteristics thereof.
Figure 7B:
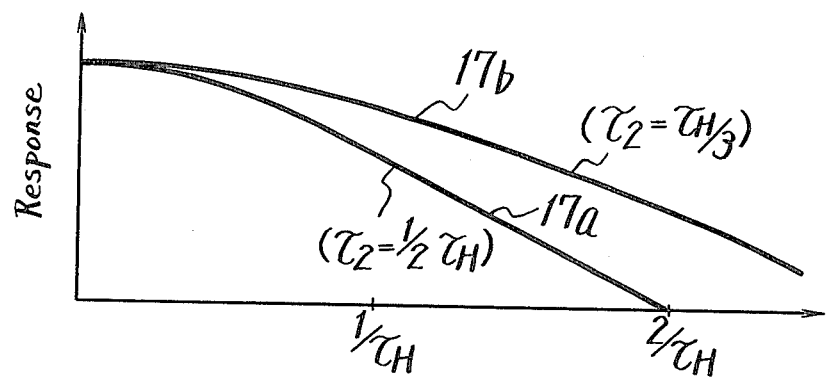

FIG. 7 shows the frequency characteristics of the invention. A curve 16 in FIG. 7A represents the case where the circuit 12 at the rear stage is a sampling circuit 12S, i.e., the frequency characteristic $O_2(f)$ at the time when the sampling is achieved by the ideal sampling pulse, from which it will be apparent that, especially the intermediate frequency band is boosted and hence the effect of the filter 13 is performed sufficiently. When the circuit 12 is made of a sample-hold circuit 12H, its frequency characteristics vary in accordance with the width $\tau_2$ of the hold pulse. In FIG. 7B, a curve 17a represents the frequency characteristic in the case where the width $\tau_2$ is selected as $\frac{1}{2}\tau_H$ and a curve 17b represents the case where the width $\tau_2$ is selected as $\frac{1}{3}\tau_H$, respectively.

Figure 7C:
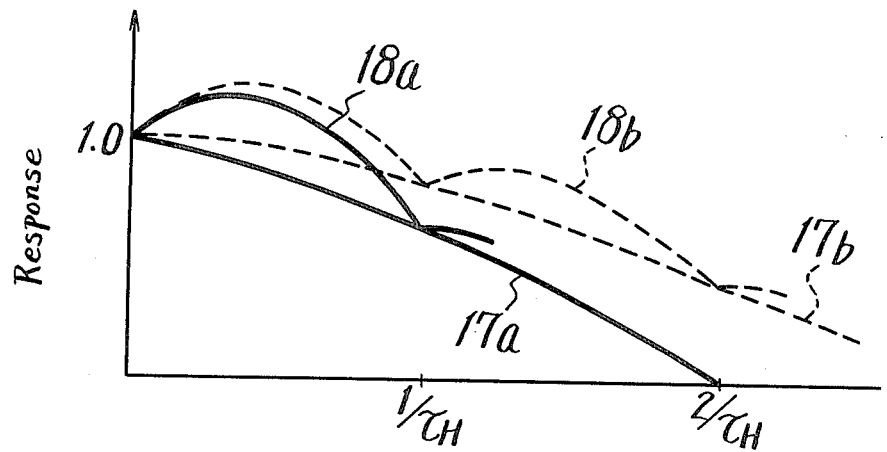

Accordingly, the frequency characteristics of the whole circuit in which the sample-hold circuit 12H is used become as shown in FIG. 7C. In FIG. 7C, a curve 18a represents the frequency characteristic in the case of $\tau_2=\frac{1}{2}\tau_H$, a curve 18b represents that in the case of $\tau_2=\frac{1}{3}\tau_H$, and the frequency characteristics in the case where the filter 13 is not used, are the same as those shown in FIG. 7B.

As may be apparent from the comparison of the invention with the prior art, when the filter 13 is interposed, the response in the intermediate frequency band and higher are boosted. As a result, the frequency characteristics are improved much.

An example of the present invention, which is applied to the signal transmission system of a solid state television camera, will be described.

FIG. 8 is a systematic block diagram showing an example of the solid state television camera, in which the fundamental circuit of the invention is applied to each of the transmission paths of the picked-up signals $S_R$, $S_G$ and $S_B$, respectively, and in which the elements or parts corresponding to those of FIG. 3 are marked with the same reference numerals and letters, respectively.

Now, the transmission path or line for the picked-up signal $S_R$ will be described. As shown in FIG. 8, a low pass filter 13R and a sampling circuit 12SR are connected in this order to the output terminal of the second sample-hold circuit 7R or at the rear stage thereof to form together with the first sample-hold circuit 5R a transmission circuit or a response compensating circuit 10R in this example. When the filter 13 for improving the frequency characteristics is interposed, the time delay caused by a former stage sample-hold circuit 11R, consisting of the sample-hold circuits 5R and 7R, disappears, so that the phase $\phi_{11}$ in view of time of the sampling pulse fed to the sampling circuit 12SR at the rear stage is compensated for by a phase shifter 9R in the delay caused by the sample-hold circuit 7R and filter 13R from the spatial phase $\theta_{11}$.

The other signal transmission systems are similarly formed, so that their detailed description will be omitted.

The respective picked-up outputs $S_R$, $S_G$ and $S_B$, which are response-compensated for, are applied to a matrix circuit 15 which then produces a luminance signal Y and a pair of color difference signals (R-Y) and (B-Y) (in which R=$S_R$ and B=$S_B$). The luminance signal Y is fed through a low pass filter 16 and a delay circuit 17 to an adding circuit 18, while the pair of color difference signals (R-Y) and (B-Y) are fed through low pass filters 19A and 19B to an encoder 20 to be converted into a desired carrier chrominance signal. The carrier chrominance signal is fed to the adding circuit 18 which is also supplied with the luminance signal Y and a composite synchronizing signal, so that a desired video signal is provided by the adding circuit 18 and then delivered to its terminal 18a.

Since the response compensation is the necessary process for the luminance signal system, if the circuit of the invention is applied to the transmission path for the luminance signal Y developed by the matrix circuit 15, the same effect is obtained.

FIG. 9 is a block diagram showing an example of this case. In this example, the response compensation is achieved by the first and second sample-hold circuits 5, 7 and the low pass filter 13 and the sampling circuit 12SR which are provided at the rear stage of the matrix circuit 15. In FIG. 9, 22 designates a phase shifter and 23 designates a pulse width control circuit, respectively.

Figure 10A:
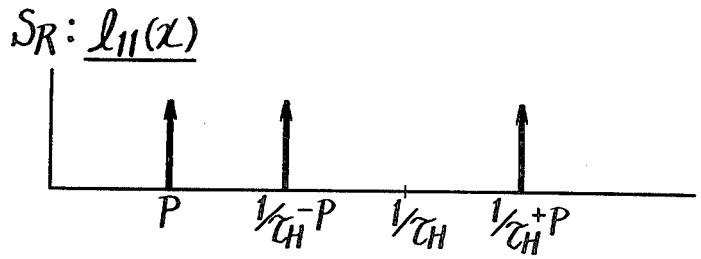
Figure 10B:
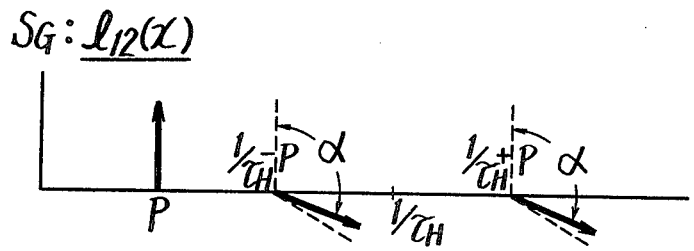
Figure 10C:
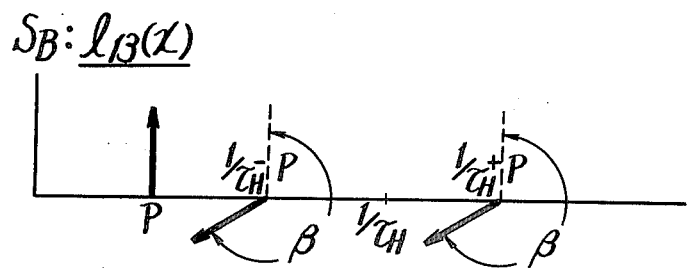

The phase relation among the respective picked-up outputs $S_R$ to $S_B$, when they are read out from the imaging devices 1R to 1B with the spatial phase $\theta_{1i}$ of the imaging devices 1G and 1B being kept, is shown in FIGS. 10A, 10B and 10C. Accordingly, if the alignment among the imaging devices 1R to 1B is perfect, the side band components are cancelled by composing the picked-up outputs $S_R$ to $S_B$ to eliminate influences on picture quality when a black and white object is picked up.

However, if any error exists in the alignment, the side band components are not cancelled and remain in a base band component $Y_B$ with the result that the picture quality can not be improved and also the band width can not be expanded. In a practical problem, the imaging device is small and, if it requires several hundreds of picture elements in the horizontal direction, the mechanical displacement corresponding to the time $\frac{1}{3}\tau_H$ is difficult to be provided. This results in that the imaging device becomes low in yield and hence expensive.

Figure 10D:
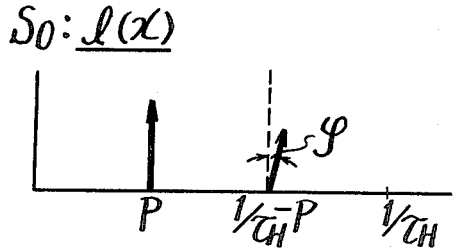

For example, when the spatial phase $\theta_{12}$ of the imaging device 1B is displaced somewhat from the normal phase (which is shown in FIG. 10B by the dotted line), the composite output $S_0$ corresponding to the luminance signal Y becomes as shown in FIG. 10D. The phase $\phi$ of the side band component in FIG. 10D shows the phase rotation after the side band component is composed.

The remaining of the side band component due to the alignment error can be easily removed by utilizing the above response compensator while the response is compensated when the error is small. That is, the pulse width $\tau_2$ and phase of the sampling pulse $P_2(x)$ applied to the sampling circuit 12S provided at the rear stage of the filter 13 is sufficient to be selected as desired. The reason will be described with reference to FIG. 9.

An output signal $l_{1i}(x)$ from the sample-hold circuits 7R, 7G and 7B will be explained first. When $i=1$, $l_{11}(x)=S_R$. Hence, $l_{12}(x)=S_G$, and $l_{13}(x)=S_B$, respectively. If it is assumed that the displacement from the reference phase in space is taken as $\theta$ as set forth above, that in time is taken as $\phi$ and the imaging device 1R is taken as the reference as shown in FIG. 1, the imaging device 1G is displaced from the device 1R by $\theta_{12}$ in space and $\phi_{12}$ in time. Similarly, the remaining imaging device 1B is displaced from the reference device 1R by $\theta_{13}$ in space and $\phi_{13}$ in time. Therefore, the output signal $l_{1i}(x)$ is expressed as follows:

$$l_{1i}(x) = K_i[R_i(p) \cos\{2\pi px + (\theta_{1i} - \Phi_{1i})\tau_H p\} \quad (18)$$
$$+ R_i(1/\tau_H - p) \cos\{2\pi(1/\tau_H - p)x -$$
$$(\theta_{1i} - \Phi_{1i})\tau_H p - \Phi_{1i}\}$$
$$+ R_i(1/\tau_H + p) \cos\{2\pi(1/\tau_H + p)x +$$
$$(\theta_{1i} - \Phi_{1i})\tau_H p - \Phi_{1i}\}$$
$$+ R_i(2/\tau_H - p) \cos\{2\pi(2/\tau_H + p)x -$$
$$(\theta_{1i} - \Phi_{1i})\tau_H p - 2\Phi_{1i}\}$$
$$+ \ldots ]$$

where
$$K_i = \frac{\tau_0}{\tau_H} \cdot \frac{\sin \pi \tau_0 p}{\pi \tau_0 p} L_i \quad (19)$$

$\tau_0$ corresponding to the opening width of the picture element, $L_i$ corresponding to the brightness of the object (the delay effect by the holding is neglected)

and $R_i(f)$ represents the total frequency characteristics of the transmission path.

In order to compensate for the alignment error in a desired frequency band, the spatial phase $\theta_{1i}$ and time phase $\phi_{1i}$ must be made coincident. Accordingly, the time phase $\phi_{12}$ for the device 1B having an alignment error is varied in correspondence with a phase $\theta_{12}$ including a displacement different from the normal phase and consequently defined as follows:

$$\theta_{1i} = \phi_{1i} \quad (20)$$

At this time, the output signal $l_{1i}(x)$ of the equation (18) becomes as follows:

$$l_{1i}(x) = K_i(p)\cos 2\pi px \quad (21)$$
$$+ K_i(1/\tau_H - p)\cos \{2\pi(1/\tau_H - p)x - \Phi_{1i}\}$$
$$+ K_i(1/\tau_H + p)\cos \{2\pi(1/\tau_H + p)x - \Phi_{1i}\}$$
$$+ K_i(2/\tau_H - p)\cos \{2\pi(2/\tau_H - p)x - 2\Phi_{1i}\}$$
$$+ \ldots$$

Accordingly, if the composite output signal $l(x)$ of the output signals $l_{11}(x)$ to $l_{13}(x)$ (the composite output signal corresponds to the luminance signal Y from the matrix circuit) is passed through the filter 13 having the cut-off frequency of $1/\tau_H$ to eliminate the components higher than $1/\tau_H$, the composite output signal $l(x)$ can be expressed as follows:

$$l(x) = K(p) \cos 2\pi px \quad (22)$$
$$+ K(1/\tau_H - p) [\cos\{2\pi(1/\tau_H - p)x\}$$
$$+ \cos\{2\pi(1/\tau_H - p)x - \Phi_{12}\} +$$
$$\cos\{2\pi(1/\tau_H - p)x - \Phi_{13}\}]$$

$$l(x) = K(p) \cos 2\pi px + \quad (23)$$
$$K'(1/\tau_H - p)\cos\{2\pi(1/\tau_H - p)x - \Phi\}$$

FIG. 10D shows the phase relation of the equation (23).

When the output signal $l(x)$ expressed by the equation (23) is applied to the sampling circuit 12S, it becomes as follows where, however, the pulse width of the sampling pulse $P_2(x)$ is taken as $\tau_2$ and its displacement from the sampling pulse applied to the reference imaging device 1R is taken as $\Delta$ (time phase is $$2\pi \frac{\Delta}{\tau_H}.$$

$$l_0(x) = \frac{\tau_2}{\tau_H} \{l(x) + 2l(x) \cdot \frac{\sin \pi \frac{\tau_2}{\tau_H}}{\pi \frac{\tau_2}{\tau_H}} \cdot \cos(2\pi \frac{x - \Delta}{\tau_H})\} \quad (24)$$

$$= \frac{\tau_2}{\tau_H} [K(p)\cos 2\pi px +$$
$$K'(1/\tau_H - p)\cos\{2\pi(1/\tau_H - p)x - \Phi\}$$
$$+ K'(1/\tau_H - p) \frac{\sin \pi \frac{\tau_2}{\tau_H}}{\pi \frac{\tau_2}{\tau_H}} \cos (2\pi px + \Phi - 2\pi \frac{\Delta}{\tau_H})$$
$$+ K(p) \frac{\sin \pi \frac{\tau_2}{\tau_H}}{\pi \frac{\tau_2}{\tau_H}} \cos\{2\pi(1/\tau_H - p)x - 2\pi \frac{\Delta}{\tau_H}\}]$$

In the equation (24), the components of the first and second terms are the base band component of the final output signal $l_0(x)$ and the components of the third and fourth terms are the side band component.

Accordingly, if the displacement $\Delta$ of the sampling pulse from the reference phase is selected by the following equation (25).

$$2\pi \frac{\Delta}{\tau_H} = \Phi - \pi \quad (25)$$

and the base and side band components at the frequency $(1/\tau_H - p)$ are selected by the following equation (26)

$$K(p) \cdot \frac{\sin \pi \frac{\tau_2}{\tau_H}}{\pi \frac{\tau_2}{\tau_H}} = K'(1/\tau_H - p) \quad (26)$$

the phase of the base band component and the phase of the side band components can be shown in FIGS. 11A and 11B, respectively. That is, the phases thereof are opposite at the frequency $(1/\tau_H - p)$ and hence in the output signal $l_0(x)$ there is no frequency component of $(1/\tau_H - p)$, i.e., side band component. In this case, however, the base band component is lowered somewhat.

As set forth above, if the equations (20), (25) and (26) are satisfied, the alignment error can be compensated for.

Since during the sampling operation the ratio between the base band component and the side band component can be varied easily by changing the window width of the sampling pulse $P_2(x)$, the equation (26) can be satisfied only by selecting the pulse width $\tau_2$. And, if the displacement phase $\Delta$ of the sampling pulse $P_2(x)$ is controlled in accordance with the phase $\phi$ based upon the alignment error, the equation (25) is satisfied. A practical example, which will compensate for the alignment error, is substantially the same as that shown in FIG. 9, in which if only the phase shifter 22 and the pulse width control circuit 23 are controlled in accordance with the alignment error, the desired purpose can be achieved.

Even if a balanced modulator is used as a circuit, which has the sampling function, in place of the sampling circuit in the example of FIG. 9, the band compensation and the alignment compensation can be similarly carried out. FIG. 12 shows such an example. To achieve this purpose, it is enough to compose the modulated output and modulating output.

In FIG. 12, 25 designates an adding or composing circuit, 26 designates a low pass filter, and 27 designates a delay circuit, respectively.

Since the modulating output is the equation (14) itself, a modulated output $M_0(x)$ becomes as follows:

$$M_0(x) = A[K(1/\tau_H - p) \cos(2\pi p x - 2\pi \frac{\Delta}{\tau_H} + \Phi) \quad (27)$$
$$+ K(p) \cos\{2\pi(1/\tau_H - p)x - 2\pi \frac{\Delta}{\tau_H}\}]$$

When the equation (25) is satisfied similar to the above and the level is selected equal, the phase relation of the modulating output becomes the same as that shown in FIG. 11A, and the phase relation of the modulated output becomes the same as that shown in FIG. 11B. Accordingly, when both the modulating and modulated outputs are composed, the side band component due to the alignment error can be positively removed.

Even with the example of FIG. 8, the alignment error can be compensated for by suitably selecting the phase and pulse width of the sampling pulse $P_2(x)$. In this case, the circuit 12 which has the sampling function may be a sample-hold circuit.

As described in the foregoing, according to the construction of the present invention, the frequency band higher than the intermediate frequency band is boosted and the band compensation becomes possible, so that the present invention can be applied to various transmission systems in addition to the above examples.

When the present invention is constructed such as shown in FIGS. 10 and 12, the alignment error can be compensated for electrically. As a result, the yield of the imaging device can be increased much.

It will be apparent that many modifications and variations could be effected by one skilled in the art without departing from the spirit or scope of the novel concepts of the present invention, so that the scope or spirits of the invention should be determined by the appended claims only.

I claim as my invention

1. A signal transmission circuit comprising:
   (a) a first sample-hold circuit for receiving an incoming signal and supplying sample-hold output signal;
   (b) a first sampling pulse supplied to said first sample-hold circuit;
   (c) a low pass filter circuit to be supplied with said sample-hold output signal from said first sample-hold circuit;
   (d) a second sampling circuit connected to said low pass filter for re-sampling an output from said low pass filter circuit; and
   (e) a second sampling pulse supplied to said second sampling circuit.

2. A signal transmission circuit as claimed in claim 1, wherein said second sampling circuit includes a signal-hold circuit.

3. A signal transmission circuit as claimed in claim 1, wherein a frequency $f_1$ of said first sampling pulse is equal to a frequency $f_2$ of said second sampling pulse, and a cut-off frequency $f_{cut}$ of said low pass filter is selected to be about said frequency.

4. A signal transmission circuit as claimed in claim 3, wherein said second sampling circuit includes a signal-hold circuit, and the phase of the second sampling pulse is adjustable relative to said first sampling pulse.

5. A signal transmission circuit as claimed in claim 4, wherein said second sampling pulse is generated by passing said first sampling pulse through a variable phase shift circuit.

6. A signal transmission circuit as claimed in claim 4, wherein a holding time at said signal-hold circuit in the second sampling circuit is made to be adjustable.

7. A signal transmission circuit as claimed in claim 4, where said signal transmission circuit is applied to a solid stage image pick-up system having a plurality of image sensing chips.

8. A signal transmission circuit as claimed in claim 7, wherein said plurality of image sensing chips are displaced each other relative to a focused object image, and said signal transmission circuit is interposed in respective outputs of said sensor chips.

9. A signal transmission circuit as claimed in claim 8, wherein said respective outputs after said signal transmission circuit are mixed for cancelling side band components for improving the resolution of a reproduced image.

10. A signal transmission circuit as claimed in claim 1, wherein said second sampling circuit is comprised of a sampling gate circuit.

11. A signal transmission circuit as claimed in claim 1, wherein said second sampling circuit is comprised of a balanced modulator and said second sampling pulse is supplied to the balanced modulator as a carrier signal.

12. A signal transmission circuit as claimed in claim 1, where said signal transmission circuit is applied to a signal derived from a sampling-type signal transmitting device.

* * * * *